Patented July 17, 1951

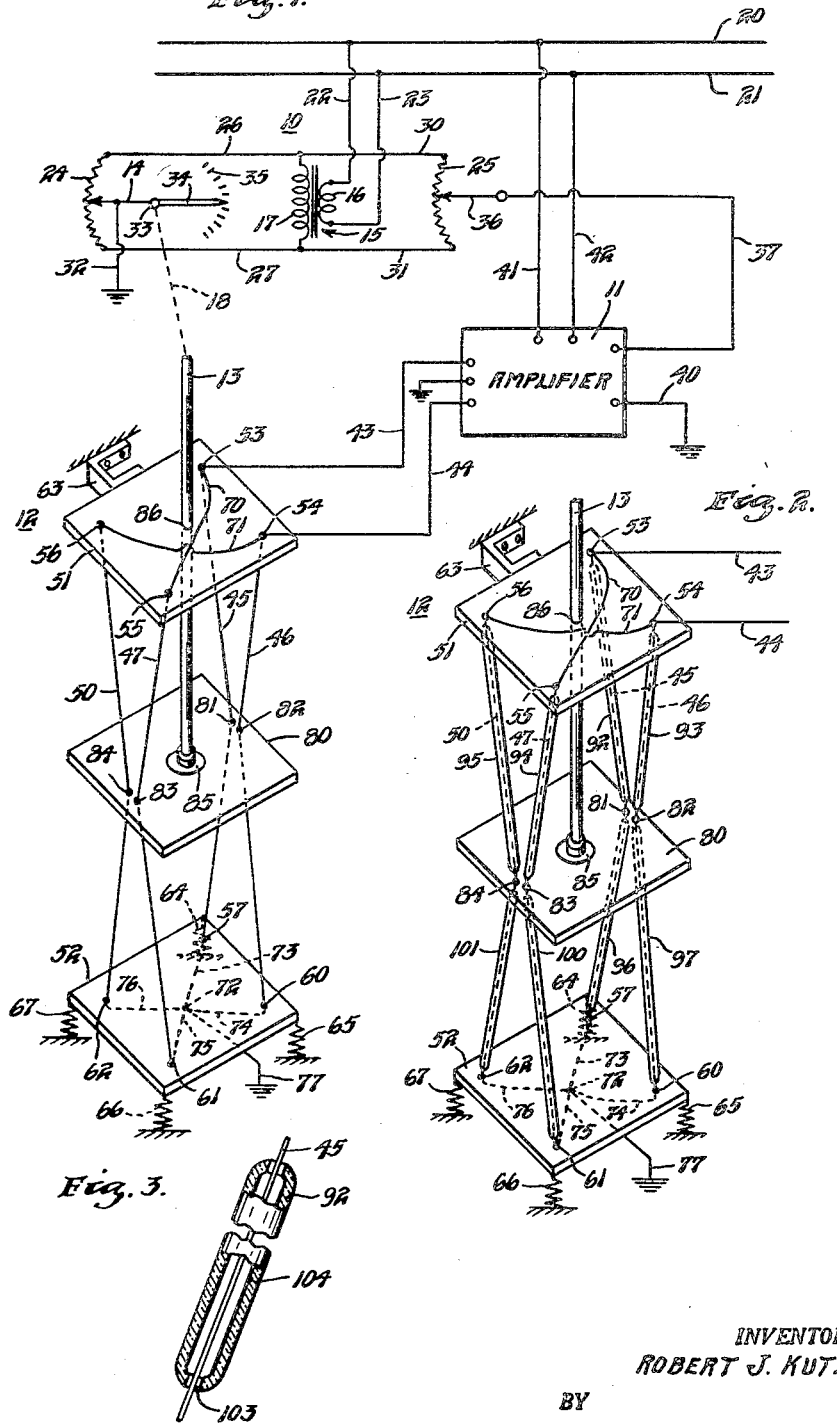

2,560,651

UNITED STATES PATENT OFFICE 2,560,651

HEAT MOTOR FOLLOW-UP SYSTEM

Robert J. Kutzler, Minneapolis, Minn., assignor to Minneapolis-Honeywell Regulator Company, Minneapolis, Minn., a corporation of Delaware Application August 4, 1948, Serial No. 42,507

7 Claims. (Cl. 318—29)

This invention relates to heat motors and in particular to the hot wire actuator type of heat motor. It is therefore an object of this invention to devise a new and improved type of hot wire actuator of sufficient strength to operate a wiper arm over a potentiometer.

Another object of the invention is to devise such a hot wire actuator system wherein the energization for heating the wires may be obtained from an electronic amplifier.

Another object of the invention is to devise a hot wire actuator which efficiently utilizes more than two wires.

Another object of the invention is to devise a hot wire actuator capable of reversible operation due to selective heating of opposite acting wires by an electronic amplifier.

Another object of the invention is to devise means for retaining the heat produced by the wires about the wires. This is accomplished by placing insulating means in the form of glass tubes about the individual wires for retaining the heat produced by the wires about the wires.

Another object of the invention is to devise means for reflection of radiant heat for retaining the heat produced by the wires about the wires. This is accomplished by placing metal leaf on the inside of glass tubes placed about the individual wires.

Methods of achieving the above mentioned objects are explained in detail following, which explanation may be read in conjunction with the accompanying drawings in which Figure 1 is a diagram of a system showing an amplifier energizing a four wire actuator capable of driving a potentiometer wiper arm, Figure 2 is a diagram of a modified form of the actuator employing glass tubing about the wires, and Figure 3 is a detailed view of the glass tubing about the wire showing metal leaf about the inside of the tubing.

In Figure 1 a bridge network 10 is shown sending a signal to an amplifier 11 which energizes a hot wire actuator 12. The hot wire actuator in turn rotates a shaft 13 to drive a wiper arm 14 through a mechanical connection 18 to rebalance the bridge.

The bridge 10 is energized by means of a transformer 15 having a primary 16 and a secondary 17. The primary 16 is fed from power leads 20 and 21 through leads 22 and 23. Transformer secondary 17 places a voltage across resistors 24 and 25. Resistor 24 is connected to transformer secondary 17 through leads 26 and 27 while resistor 25 is connected to transformer 17 through leads 30 and 31. Resistor 24 has a wiper arm 14 which is tied to ground through lead 32. Wiper arm 14 is extended beyond its pivot point 33 to form a pointer 34 which operates over an indicator dial 35. Resistance 25 is operated on by a wiper arm 36 which may be moved by any suitable means such as a condition responsive means, not shown.

It will be seen that the resistors 24 and 25 along with transformer 15 form a bridge whose output terminals are the wiper 36 and grounded wiper 14. When these wipers are in the same relative position, the bridge is balanced.

Wiper arm 36 is connected to the input of amplifier 11 through a lead 37. The other amplifier input connection is made from wiper arm 14 through lead 32 to ground and from there to lead 40 to the amplifier. The amplifier 11 is connected to the alternating voltage power lines 20 and 21 through leads 41 and 42. The amplifier output is taken through leads 43 and 44 to the hot wire actuator 12. The amplifier is of the type which will accept an input of reversible phase, amplify the signal, and produce an output which will energize either of two output circuits depending on the phasing of the signal input. Thus if the signal is of one phase lead 43 will be energized with respect to ground and if the signal is of the opposite phase lead 44 will be energized with respect to ground. Amplifier 11 may be of the type disclosed in the Upton Patent Serial No. 2,423,534 and assigned to the present assignee.

The hot wire actuator 12 is shown as having 4 wires 45, 46, 47, and 50. The four wires are attached to two non-rotatable members 51 and 52. Wires 45, 46, 47 and 50 are shown connected to non-rotatable member 51 by terminals 53, 54, 55 and 56 respectively. Leads 45, 46, 47 and 50 are shown connected to non-rotatable member 52 by terminals 57, 60, 61 and 62 respectively.

Non-rotatable member 51 is shown connected to a fixed base by means of an immovable arm 63 while non-rotatable member 52 is shown connected to a fixed base by means of springs 64, 65, 66 and 67 for purposes to be explained later. It can be seen by the drawing that non-rotatable members 51 and 52 are heteroplaner, that is, they are on different planes.

Lead 43 from amplifier 11 is shown connected to terminal 53 of wire 45 and by means of a jumper lead 70 to terminal 55 of wire 47. Lead 44 is shown connected to terminal 54 and by means of a jumper lead 71 to terminal 56. Thus it can be seen that wires 45 and 47 are energized simultaneously as are wires 46 and 50.

The four wires, 45, 46, 47 and 50 are shown connected to a common terminal 72 through leads 73, 74, 75 and 76 from terminals 57, 60, 61 and 62 respectively and from terminal 72 through lead 77 to ground. It is understood, of course, that instead of using jumper leads 70 and 71 and the leads 73, 74, 75 and 76 connected to common terminal 72, jumper leads could be placed between terminals 57 and 61 of wires 45 and 47 and between terminals 60 and 62 of wires 46 and 50 and connecting terminals 55 and 56 together and connecting them to ground. If the connections were made in the manner just described wires 45 and 47 would be in series as would wires 46 and 50. As a result, the resistance between lead 43 and ground and between lead 44 and ground would be four times as great and the current through each wire would be only half of the current which would flow through the wires when the connections used are those shown in the drawing. If the amplifier output is used to heat the wires the series connections of the wires would be preferable to more closely match the output impedance of the amplifier but if the amplifier output is connected to relays which operate to close energizing circuits to the wires the parallel connections would be preferable because of the greater thermal response obtained with respect to series connections.

A rotatable member 80 is shown placed midway between the two non-rotatable members 51 and 52 and is parallel therewith. The four wires, 45, 46, 47 and 50 pass through holes 81, 82, 83 and 84 respectively in the rotatable member 80.

The shaft 13 is shown rigidly fastened to rotatable member 80 by means of a flange 85. This shaft 13 easily passes through the center of the non-rotatable member 51 through a hole 86 provided for this purpose, the shaft 13 being rotatable with respect to member 51.

On the upper end of shaft 13 is the mechanical connection 18 connected to wiper arm 14 and rotating the wiper arm about pivot point 33 to cause operation of wiper arm 14 and pointer 34.

*Operation*

As shown in the drawing the system is in balance and the leads 43 and 44 from amplifier 11 will have no potential difference between them.

If, for example, a controlling condition should be such as to cause clockwise rotation of wiper arm 36 on resistor 25 so as to cause the wiper arm to move toward the upper end of the resistor a voltage difference would occur between wiper arms 36 and 14 and result in a signal input into the amplifier 11. This signal would be amplified and result in lead 43 having a greater potential with respect to ground than lead 44. This would cause greater current to pass through leads 45 and 47, causing them to heat up and thus expand. Because the four wires 45, 46, 47 and 50 are all in tension leads 46 and 50 would pull the rotatable member clockwise to equalize the tension on the four wires. Springs 64, 65, 66 and 67 pull the non-rotatable member 52 down against the tension of the wires and keep the wires taut. When the tension on the four wires is again equalized because of sufficient rotation of member 80, the rotatable member 80 will come to rest.

Rotation of member 80 causes rotation of shaft 13 fixed thereto and results in clockwise rotation of wiper arm 14 on resistor 24 and pointer 34 on indicator dial 35. Wiper arm 14 does not quite reach the same position on resistor 24 as wiper arm 36 is on resistor 25 because then the potential difference between the two wiper arms would be wiped out and the signal to amplifier 11 would be decreased to zero. A small signal is necessary when the two wiper arms are not at center in order that a current will flow through wires 45 and 47 to keep them expanded. It is seen that the greater the sensitivity the smaller the signal that is necessary to keep the wires expanded.

If the controlling condition should now cause wiper arm 36 to move in a counterclockwise direction toward the bottom of resistor 25 the signal input to amplifier 11 would be reversed. This would result in lead 44 having a greater potential difference with respect to ground than would lead 43. As a result leads 46 and 50 would have greater current flow therethrough and would thus expand to cause counterclockwise rotation of member 80 to move wiper arm 14 and pointer 34, through mechanical connection 18, counterclockwise on resistor 24 and indicator dial 35 respectively. When wiper arms 14 and 36 are again almost at points of equal potential the signal input to amplifier 11 will be decreased sufficiently to retain wires 46 and 50 expanded the amount necessary to produce the signal required.

Rotatable member 80 is capable of moving almost 45 degrees to either side of the rest position in which it is shown in the drawing. When the rotatable member is rotated almost 45 degrees in a counterclockwise direction the distance from terminal 53 to hole 81 to terminal 57 and from terminal 55 to hole 83 to terminal 61 is shorter than at any other position of rotatable member 80. When the rotatable member is moved in a clockwise direction through almost 45 degrees from the rest position the distance from terminal 54 to hole 82 to terminal 60 and from terminal 56 to hole 84 to terminal 62 is shorter than at any other position of rotatable member 80.

It is to be understood, however, that rather than going through separate holes, wires 45 and 46 can go through the same hole in rotatable member 80 and wires 47 and 50 could go through the same hole in rotatable member 80.

The hot wire actuator shown in Figure 2 is identical with the hot wire actuator shown in Figure 1 with the exception that glass tubing is shown placed about the wires 45, 46, 47 and 50 over most of their length. Like components have like numbering.

Wires 45, 46, 47 and 50 extending between rotatable member 80 and non-rotatable member 51 are covered throughout most of their length by glass tubes 92, 93, 94 and 95 respectively. The lower end of wires 45, 46, 47 and 50 between members 80 and 52 are covered throughout most of their length by glass tubes 96, 97, 100 and 101. Because of the expansion and contraction of the hot wires 45, 46, 47 and 50 it is not possible to extend the glass tubing over the entire length of the wires.

Reference is now made to Figure 3 for a more detailed explanation of the glass tubing. The tubing shown is that surrounding wire 45 and is numbered 92. The glass tubing is shown to be brought in at both ends and has apertures 103 smaller than the inside diameter of the tubing through most of its length. This is for a purpose to be explained later. A section of the glass tubing is shown broken away to show metal leaf 104 around the inside of the tube along most of its length. This metal leaf is very thin and may be of any metal capable of reflecting radiant heat energy such as copper. The purpose of this metal leaf is to reflect the radiant heat energy given off by the wire back to the wire and thus cause greater expansion of the wire for a given amount of current therethrough. This means that the wiper arms may more closely approach balance when they are off center than would be the case were the leaf not used.

The glass tubing acts as an insulator to reduce convection heat loss within the area it encloses about the wire while the metal leaf about the inside of the glass tubing reflects the radiant heat energy back to the wire.

The apertures 103 are smaller than the inside diameter of the glass tubing and metal leaf thereon to prevent the wire 45 from making contact with the metal leaf. If the wire were to make contact with the metal leaf most of the current would flow through the metal leaf and little of it would flow through the wire 45. As a result there would be very little heat generated within the glass enclosure to cause the wires to expand. The apertures 103 are several times larger than the cross-sectional area of wire 45 to permit rapid exit of the heat when the current flow through the wire has decreased and also to prevent the tubing from catching in the hole 81.

It is to be understood that this invention is not to be considered limited to the particular modification herein described but is rather to be defined by the extent of the claims hereto appended.

I claim as my invention:

1. An electronic amplifier having a reversible output, a balanceable impedance network electrically connected to said amplifier for providing an input thereto, sensing means for unbalancing said bridge, a reversibly rotatable shaft, a plurality of pairs of thermally expansible wires connected to said shaft for reversible rotation thereof upon selective heating of said wires, means electrically connecting said wires to said amplifier for selective electrical heating of said wires, and control means operated by said shaft to cause said network to approach rebalance upon rotation of said shaft by said wires.

2. A balanceable impedance network operated upon by a condition controlled sensing element and means for approaching rebalancing of said network comprising; a reversible electronic amplifier energized from said network, a plurality of thermally expansible wires selectively heated by said amplifier, and means so connecting said wires with said network that selective heating of said wires by said amplifier causes said network to approach rebalance.

3. In combination: a plurality of thermally expansible wires; a pair of fixed, hetero-planer members; a rotatable member between said fixed members; means connecting said wires to said fixed members; means angularly displacing said wires by said rotatable member; and means selectively heating either a first portion of said wires or a second portion of said wires to cause rotation of said rotatable member in a first or a second direction depending on which portion of the wires is heated.

4. In combination: an even number of thermally expansible wires; a plurality of spaced apart members at least one of which is non-rotatable and another of which is rotatable; means connecting said wires to said members; means selectively heating half of said wires to cause rotation of said rotatable member; and heat insulating means about each wire to hinder the dissipation of heat from about the wire.

5. In combination: an even number of thermally expansible wires; a pair of spaced apart non-rotatable members; means connecting said wires between said members such that the wires are evenly spaced from each other; a reversibly rotatable member between said non-rotatable members; means connecting the wires to the rotatable member such that the spacings between the wires at the rotatable member are uneven; means for selectively energizing a first half or a second half of said wires to cause rotation of said rotatable member in a first or a second direction depending on which half of the wires is heated; and a coated glass tube about each wire to retain the heat from the wire about the wire.

6. In combination: a first plurality and a second plurality of thermally expansible wires; means fixedly positioning the terminals of said wires symmetrically about an axis; a member rotatable about said axis and connected to said wires in such a manner that heating of one plurality of wires rotates the member in one direction and heating of the other plurality of wires rotates the member in the opposite direction; and connections by which the wires may be selectively heated.

7. In combination: four thermally expansible wires; two spaced apart non-rotatable members one of which is fixed and the other in which is mounted on springs to permit movement toward and away from said one member; means connecting said wires to said members such that the terminals of the wires on each member form the corners of a square; a rotatable member between the non-rotatable members; means passing the wires through the rotatable member such that the points of passage of the wires through the rotatable member form the corners of a rectangle which is not a square; means connecting the wires terminalled at opposite corners of the squares together to form a first and a second pair of wires; and means selectively energizing one or the other of the pairs of wires to cause rotation in one direction or the other of the rotatable member.

ROBERT J. KUTZLER.

REFERENCES CITED

The following references are of record in the file of this patent:

UNITED STATES PATENTS

| Number | Name | Date |
|--------|------|------|
| 952,778 | Wohl et al. | Mar. 22, 1910 |
| 954,682 | Low et al. | Apr. 12, 1910 |
| 1,987,717 | Smith | Jan. 15, 1935 |
| 2,012,603 | Fuchs | Aug. 27, 1935 |
| 2,423,534 | Upton | July 8, 1947 |
| 2,442,764 | Ferrill, Jr., et al. | June 8, 1948 |

FOREIGN PATENTS

| Number | Country | Date |
|--------|---------|------|
| 649,254 | Germany | Apr. 1, 1936 |

Certificate of Correction

Patent No. 2,560,651

July 17, 1951

ROBERT J. KUTZLER

It is hereby certified that error appears in the printed specification of the above numbered patent requiring correction as follows:

Column 6, line 38, for "other in" read *other of*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*